March 5, 1968 R. S. CATALDO 3,372,393

RADIO REMOTE CONTROL SYSTEM

Filed April 5, 1965 2 Sheets-Sheet 1

INVENTOR.
Roy S. Cataldo
BY
Hugh L. Fisher
ATTORNEY

INVENTOR.
Roy S. Cataldo
BY
Hugh L. Fisher
ATTORNEY

United States Patent Office 3,372,393

Patented Mar. 5, 1968

3,372,393

RADIO REMOTE CONTROL SYSTEM

Roy S. Cataldo, Birmingham, Mich., assignor to General Motors Corporation, Detroit, Mich., a corporation of Delaware Filed Apr. 5, 1965, Ser. No. 445,575
7 Claims. (Cl. 343—225)

ABSTRACT OF THE DISCLOSURE

A radio remote control signal system comprising a transmitter producing a chain of distinct frequency pulses of separately variable width. Pulse width modulation is accomplished by steering a sinusoidal waveform into two paths, one of which may be phase shifted with respect to the other and generating a tone during the time interval between like amplitude points of the original and shifted waveforms. A frequency-selective, width demodulating receiver is provided.

*Summary of the invention*

This invention relates to remote control systems and more particularly to a radio remote control system having one or more control channels in which information is represented by the duration of control signals.

It is well known that information may be carried by an electrical signal quantity by modulating various characteristics of the quantity. For example, the amplitude, frequency or phase of a periodic waveform may be varied to provide proportional control of an instrumentality such as a servo motor. Regarding only amplitude modulation, it is well known that conventional amplitude modulation requires comparatively elaborate circuitry including precise electrical energy valving devices used in a control mode.

On the other hand, the average value of a rectangular waveform may be varied over successive cycles by varying the duration of the rectangular pulses while maintaining a substantially constant frequency of occurrence. In this modulation technique, which is commonly called pulse duration modulation, transistors or other devices may be operated in essentially a switching mode, thus contributing to an overall simplification of the circuitry and an increase in accuracy and efficiency of the system.

Where several channels of information are desired, such a multichannel system may be achieved by interlacing a number of rectangular pulses wherein each pulse represents an individual signal channel. The process of interlacing of channels so that each is "on" for a discrete time period is known as time division multiplexing, and the number of times per second the entire process is repeated is known as the sampling rate.

The present invention provides a control system which may be of particular advantage in a radio remote control system wherein information is conveyed over one or more signal channels employing the advantageous pulse duration modulation technique generally described above. In accordance with the invention, a control signal of variable duration may be produced for use in a system such as a radio remote control system wherein variable information must be conveyed from one point to another. In general, this may be accomplished through the provision of means for producing a basic periodic waveform in a signal channel including two waveform processing paths, the first of which includes means, such as a differentiator, for producing a first discrete signal, such as a voltage pulse, which corresponds to a predetermined point in the periodic waveform. The other of the signal paths includes means for selectively phase shifting the periodic waveform which is transferred through the second path, and means such as a differentiator for producing a second discrete signal which also corresponds to a predetermined point in the periodic waveform transferred through the second path. The first and second discrete signals are separated in time by the amount of phase shift selected in the second waveform processing path. By communicating the two discrete signals to a control signal generating means, this means may produce an output which corresponds in duration to the time interval between the first and second discrete signals. By selectively phase shifting the periodic waveform in the second of the above-mentioned paths, the duration of the output of the signal generating means may be varied over any desired range to produce an electrical signal which is modulated in duration in accordanc with specific information.

In accordance with a further feature of the invention, a multichannel control system may be provided which may be used to produce a plurality of time-staggered control signals in the time division multiplexing mode previously described. In accordance with this embodiment of the invention, means may be provided for producing a plurality of periodic waveforms of similar shape but which are mutually and progressively phase shifted with respect to one another such that each waveform occupies a different portion of an overall signal period. Each of the plurality of waveforms may be connected to a signal channel which in the manner described above employs two signal processing paths, one of which includes a phase shifting means for modulating the duration or the interval between two discrete signal pulses which are produced by the respective control channels.

In accordance with a still further aspect of the invention, the plurality of duration modulated signals may be employed in a time division multiplexing fashion to produce radio control signals which may be transmitted to a receiver where the signals may be used to perform various operations in the various signal channels. In general, this may be accomplished by utilizing the control signals in each of the various signal channels to produce a radio signal having a distinctly identifiable character such as a distinct frequency. In such a case the receiver is also provided with filter means such as frequency selective devices to separate the various channels on the basis of the distinct character of the signal and to produce final concontrol signals which vary as a function of the duration of the transmitted signals in the respective channel.

The invention may be best understood by a reading of the following specification which describes a specific embodiment thereof. The specification is to be taken with the accompanying figures of which:

The specific embodiment of the invention to be described herein is a five channel radio remote control system for an automotive vehicle including signal channels for controlling the steering and braking of the vehicle as well as various other operations such as transmission range selection and so forth.

Figure 1:
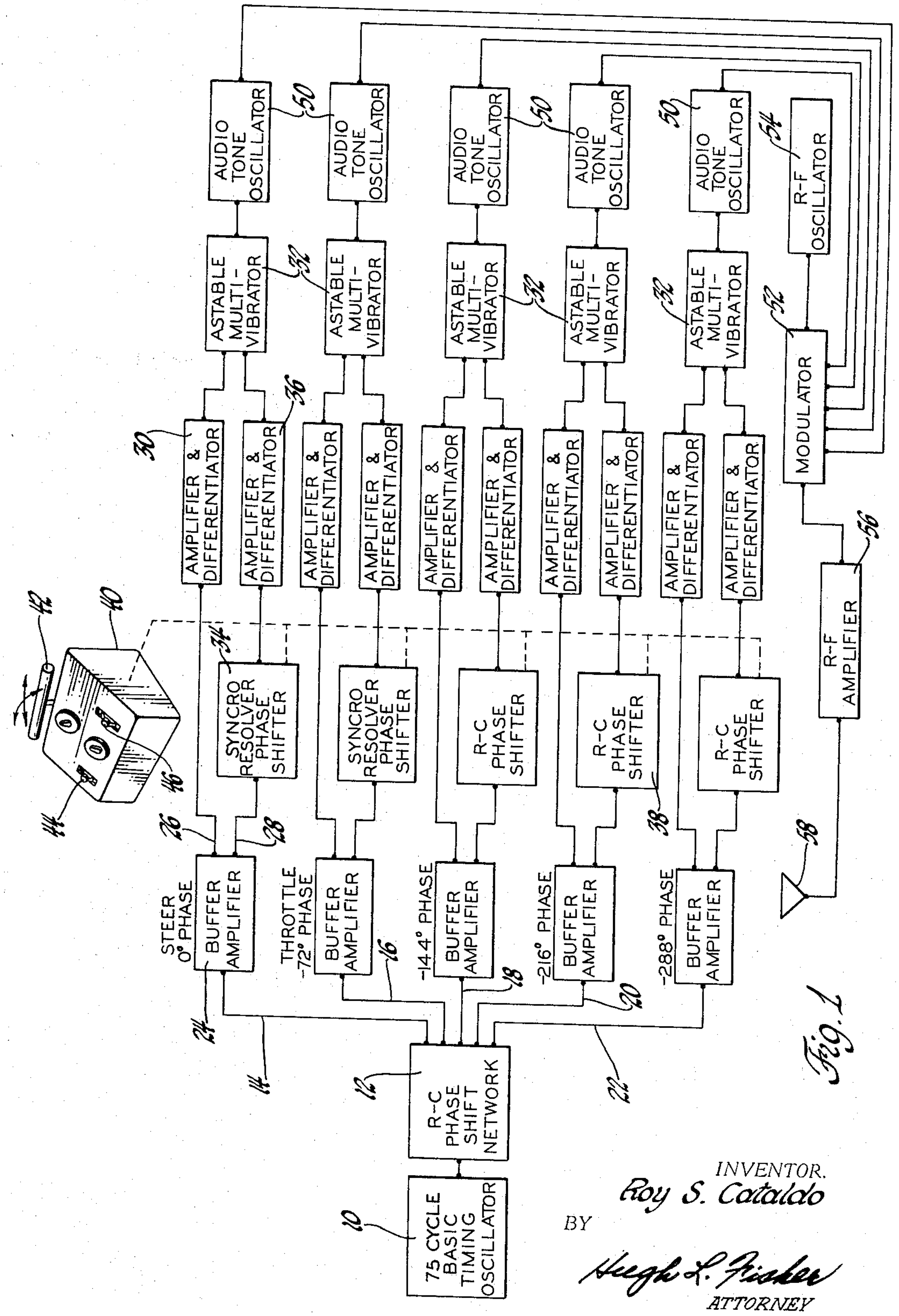
FIGURE 1 is a block diagram of a multichannel transmitter system.

Referring specifically to FIGURE 1, a periodic waveform preferably of sinusoidal shape is produced by a basic timing oscillator 10 and is used as the reference wave form for the entire system. In the specific embodiment, the periodic waveform is a 75 cycle per second sinusoidal signal.

The sinusoidal output of the basic timing oscillator 10 is connected to an RC phase shifting network 12 having five outputs connected to five signal channels represented in FIGURE 1 by lines 14, 16, 18, 20, and 22. The phase shift network 12 includes a plurality of RC phase shift circuits operative to provide a sinusoidal output on each of the five outputs which is similar in wave shape to the sinusoidal output of basic timing oscillator 10. However, the waveforms conveyed to the five channels 14, 16, 18, 20, and 22 are progressively shifted in phase by an angle of 72°. Thus the output on channel 14 has a zero relation with the output from oscillator 10, whereas the output on channel 16 occurs 72° in phase later. Similarly the outputs on channels 18, 20, and 22 lag the output of the preceding channel by an angle of 72 electrical degrees. The phase shift angle of 72° is chosen in the present embodiment as being the quotient of 360° divided by the number of channels provided.

Each of the signal channels 14, 16, 18, 20, and 22 is substantially similar to the other and thus only one of the channels will be described in detail. Channel 14, as an example, may be that channel which is used to provide steering signals to a remotely controlled automotive vehicle. The sinusoidal waveform in channel 14 is amplified by a buffer amplifier 24 and distributed to two waveform processing paths 26 and 28. Waveform processing path 26 includes an amplifier and differentiator 30 which is effective to produce a first discrete signal which defines the beginning of the "on" time for signal channel 14. To accomplish this the amplifier and differentiator detects the zero cross-over of the sinusoidal waveform in the negative direction to produce a square wave from the original sine waveform. This square wave is differentiated to produce sharp voltage pulses on the edge of the square wave. The positive voltage pulses may be discarded by way of a diode circuit and the negative pulses used to define first discrete signals which indicate the "start" time of a rectangular waveform to be produced in channel 14. This waveform is produced by a multivibrator 32 which has the first output connected to receive the output from differentiator 30. Upon the occurrence of the output from differentiator 30, the astable multivibrator 32 begins producing a rectangular voltage waveform.

The sinusoidal waveform from buffer amplifier 24 is also conveyed through the second waveform processing path 28. This path includes a synchro resolver phase shifter 34 which is selectively controllable to selectively shift in phase over a predetermined range the sinusoidal waveform in path 28. After the phase shift, the sinusoidal waveform is applied to an amplifier and differentiator 36 which is effective to produce a second discrete signal defining the end of the rectangular voltage waveform to be produced in channel 14. In a manner similar to that employed by amplifier 30, the amplifier and differentiator 36 also produces a square waveform from the sinusoidal waveform and differentiates this waveform to produce negative going voltage pulses which are applied to the other input of astable multivibrator 32. Upon the occurrence of a pulse from differentiator 36, the astable multivibrator is turned off. Thus, according to the amount of phase shift introduced by resolver phase shifter 34, the duration of the control signal which is produced by astable multivibrator 32 may be varied over a predetermined range.

Each of the other signals 16, 18, 20, and 22 functions in a manner similar to that described with respect to channel 14. One particular difference may exist between, for example, channel 18 and channel 14. In channel 18 the phase shifting means may take the form of a simple variable RC phase shifter 38. In phase shifter 38 capacitors may be selectively switched in and out of the circuit to produce a varying amount of phase shift in discrete steps rather than smoothly and continuously as may be accomplished with synchro resolver phase shifter 34. This serves to illustrate the fact that various phase shifting means may be employed in place of elements 34 and 38 as suits the particular application.

From the foregoing it can be seen that five channels of information are provided with each channel being interlaced in a proper time position with the other channels. This multiplexing technique and the proper interlacing which is necessary thereto is provided automatically by having first phase shifted the sine wave from basic timing oscillator 10 into the five channels through RC phase shift network 12.

The degree of phase shift accomplished in the second path of each of the signal channels 14, 16, 18, 20, and 22 is controlled by means of a master control unit 40. This control unit 40 may be electrically or electromechanically connected to each of the phase shifting devices including synchro resolver 34 and RC phase shifter 38. The control unit 40 carries a number of control elements including a displaceable bar 42 which may be used for both steering, accelerating and braking an automatically controlled vehicle. Master control unit 40 may also carry such other auxiliary control switches such as 44 and 46 which may be used to control the transmission mode, honking of the horn, and so forth. The particular nature of the outputs produced by control unit 40 may vary according to the application as will be apparent to those skilled in the art and will not be described in detail.

Summarizing briefly, a rectangular control pulse of predetermined duration is generated in each of the astable multivibrators 32 in the signal channels 14, 16, 18, 20, and 22. This is accomplished by feeding the discrete signal pulse from amplifier and differentiator 30 to the multivibrator 32 to define the "start" time of the control pulse, and feeding the time-variable discrete signal pulse from amplifier and differentiator 36 to the multivibrator 32 to define the "off" time of the signal from the multivibrator. Since the time of occurrence of the pulse from amplifier and differentiator 36 is variable in accordance with the setting of the control element in master control 40 which corresponds with synchro resolver phase shifter 34, it can be seen that the control signal from multivibrator 32 is of variable duration.

To this point the basic requirements of producing a multichannel pulse width modulated remote control system have been met. For purposes of radio transmission, some additional means of identifying each channel in the transmitter and receiver systems is required. In the embodiment shown in FIGURE 1, the additional identification of the signals in each of the channels is accomplished by feeding the output from each of the astable multivibrators 32 to an audio tone oscillator 50. The signal from multivibrator 32 operates to turn on the audio tone oscillator 50 for a period corresponding with the duration of the output pulse of the multivibrator 32. Hence, rather than transmitting the actual rectangular control pulse from the multivibrator, a sine wave burst defined in duration by the rectangular wave is used.

Each of the audio tone oscillators 50 is tuned to produce an output of distinct frequency which is used to identify the particular channel transmitting at any particular time.

For radio transmission purposes, the outputs of the audio tone oscillator 50 are connected to separate inputs of a modulator 52 which is used as a passive summing network, the output of which represents five interlaced signals of distinct frequency and of individual duration corresponding with the degree of modulation entered by way of the master control 40. These five signals are used to modulate the output of an RF oscillator 54. The modulated signal is amplified by an RF amplifier 56 and fed to an antenna 58 for transmission to a receiver unit. This receiver unit may, for example, be mounted in a heavy-duty vehicle and so connected with the various control instrumentalities of the vehicle to afford remote control thereof.

Figure 2:
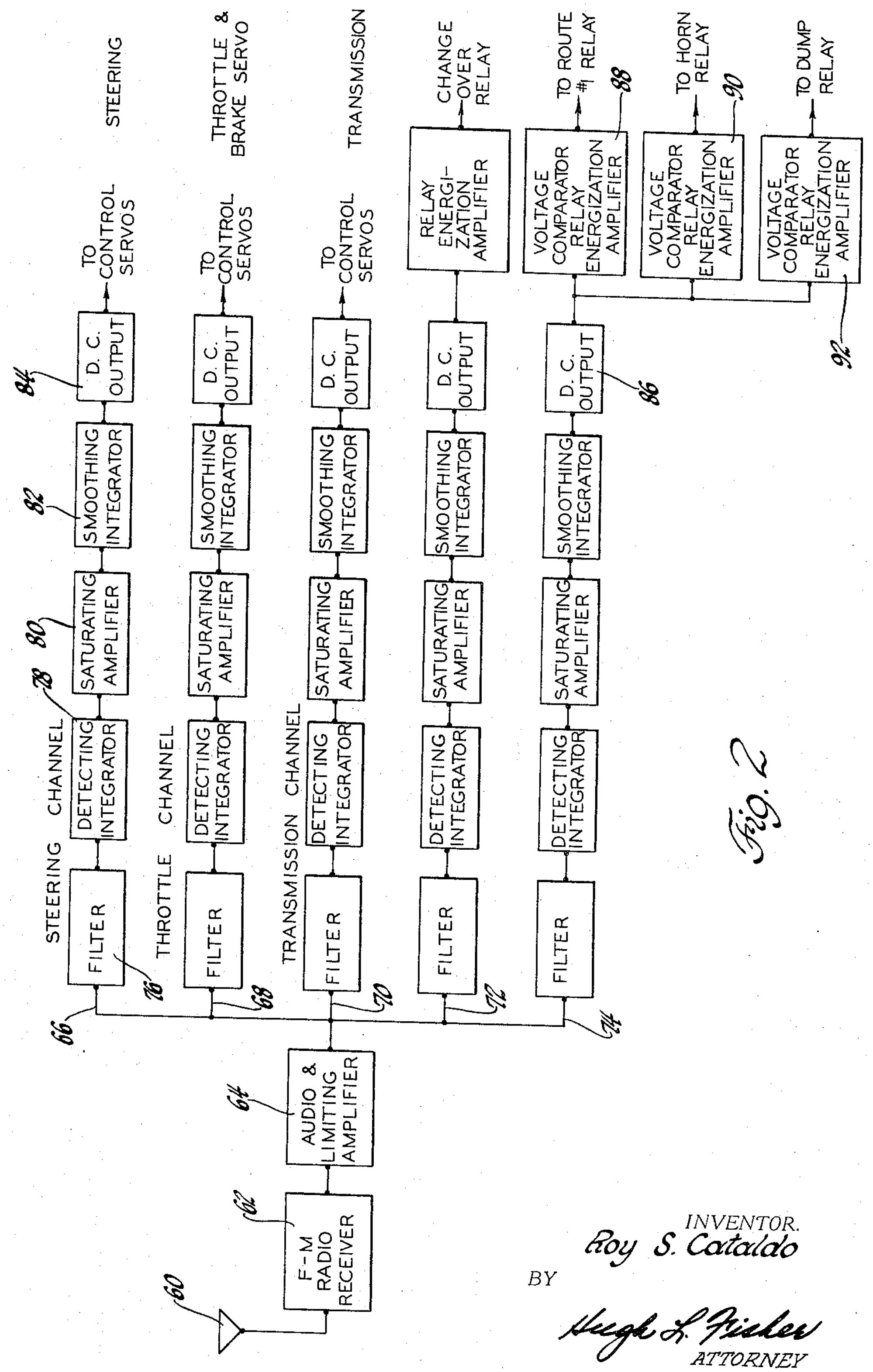
FIGURE 2 is a block diagram of a multichannel receiver system adapted to receive and to separate the signals transmitted by the apparatus shown in FIGURE 1.

Referring now to FIGURE 2, the receiver system is shown in detail. The five channel time multiplexed signal may be received on an antenna 60 which preferably is of the omnidirectional variety. The signal appearing on antenna 60 is fed to a standard FM radio receiver 62 and then to an audio amplifier 64 which also incorporates an automatic gain control function. After being demodulated in the receiver 62 and controlled in gain and amplitude, the five channel time multiplexed signal is distributed among five receiver channels 66, 68, 70, 72, and 74. Each of the channels is substantially alike, therefore, only one will be described in detail. For example, referring to channel 66 a filter 76 is provided for passing the signal of the frequency which corresponds to that which designates the steering channel 66 and rejecting the others. In a similar fashion, the filter circuits in each of the other receiver channels passes only the particular frequency which identifies that channel. The filtered signals from filter 76 are then connected to a detecting integrator 78 which effectively removes the audio tone and produces an output in the form of a rectangular voltage pulse which corresponds in width with the control pulse originally generated by astable multivibrator 32 shown in the transmitter system of FIGURE 1. Similarly, the detecting integrators in each of the other channels produce outputs which effectively restore the rectangular waveforms which correspond to those channels and having respective durations which correspond to the durations of the control signals generated in the multivibrators associated with corresponding control channels in the transmitter unit. The output from detecting integrator 78 is fed through a saturating amplifier 80 which amplifies and clips the signal to remove any amplitude variation. This constant amplitude variable width pulse is then integrated at 82 to provide a direct voltage signal at 84 which may be used in any direct voltage channel which requires continuously proportional control. The channel 66 is shown to control a steering servo unit so as to direct a vehicle in accordance with the angular position of the steering bar 42 of the control unit 40 shown in FIGURE 1.

The DC output from channel 74 is used in another manner illustrating an additional feature of the present invention. If it is desired to select any one of a number of functions in a particular channel, this may be done by passing the DC signal appearing at 86, for example, through a number of two-way voltage comparator circuits 88, 90, and 92. Each of the compartor circuits is capable of detecting any prescribed interval of voltage. Thus the total DC voltage swing at the output 86 of channel 74 may be divided into three or more finite increments, each one of which is capable of controlling a separate function. FIGURE 2 indicates that the voltage comparators are used to drive corresponding relays. These relays may be of the commercially available solid state type.

The foregoing specification describes a specific embodiment of the invention in the form of a five-channel pulse duration modulation time multiplexed remote control system. The transmitter portion of the system provides five time interlaced signals of distinct frequencies, each of which may be varied in duration in accordance with the information to be transmitted in the particular channel. The transmitted signal is received by an FM receiver and distributed among five receiver channels by a frequency discrimination technique. The control signal of rectangular waveform and predetermined duration is reconstituted in each of the signal channels and integrated to provide a DC voltage which is proportional to the duration of the control signals. This DC output may be employed in various manners to control servo units regulating the operation of an instrumentality or through voltage increment detectors in corresponding energization units such as relays to control other correspondingly energizable instrumentalities.

Since various modifications to the embodiments shown in FIGURES 1 and 2 may be made without departing from the spirit and scope of the invention, it is to be understood that this specific embodiment is not to be construed as limiting the invention to the specific apparatus shown. For a definition of the invention reference should be had to the appended claims.

I claim:

1. Apparatus for producing a control signal of variable duration including means for producing a periodic waveform, first and second waveform processing paths connected to receive the periodic waveform, the first path including means for producing a first discrete signal corresponding to a first predetermined point of the periodic waveform, the second path including means for selectively phase-shifting the periodic waveform and means for producing a second discrete signal corresponding to a second predetermined point of the periodic waveform which is spaced in time from the first point according to the amount of phase shift in the second path, and control signal generating means having first and second inputs and an output for producing a control signal at said output corresponding in duration to the time interval between the signals applied to the inputs, the first and second inputs being connected to receive the first and second discrete signals, respectively.

2. Apparatus for producing a signal of predetermined character and of variable duration including the apparatus defined in claim 1 and further including output means for producing a signal of said predetermined character in response to the control signal and for the duration of the control signal, the output means being connected to receive the output of the control signal generating means.

3. Apparatus for producing a plurality of time staggered control signals of variable duration including means for producing a periodic waveform, phase shift means having an input and a plurality of outputs and adapted to produce signals on said outputs corresponding in waveform to a signal applied to the input but progressively shifted in phase with respect thereto by a predetermined phase angle, a plurality of control channels connected to respective outputs of the phase shift means, each of the control channels comprising first and second waveform processing paths, each of the first paths including means for producing a first discrete signal corresponding to a first predetermined point of the periodic waveform received thereby, each of the second paths including means for selectively phase-shifting the periodic waveform received thereby and means for producing a second discrete signal corresponding to a second predetermined point of the waveform received thereby, the second signal being spaced in time from the first signal according to the phase shift applied in the second paths, a plurality of control signal generating means having first and second inputs and an output for producing a control signal corresponding in duration to the time interval between the signals applied to the inputs, the first and second inputs of the control signal generating means being connected to receive the first and second discrete signals, respectively, of respective control channels, and master control means operatively connected to the second paths of the control channels for individually selecting the degree of phase shift of the periodic waveform in each of said second paths.

4. Apparatus as defined in claim 3 including a plurality of output means for producing output signals of distinct character in response to a control signal and for the duration of the control signal, the output means being connected to receive the control signals from respective control signal generating means.

5. Apparatus as defined in claim 4 including transmitter means connected to receive the outputs of the output means for transmitting time staggered radio signals representing the character and duration of each of the outputs.

6. A radio control system including transmitter means and receiver means, the transmitter means including means for producing a periodic waveform, first and second waveform processing paths connected to receive the periodic waveform, the first path including means for producing a first discrete signal corresponding to a first predetermined point of the periodic waveform, the second path including means for selectively phase-shifting the periodic waveform and means for producing a second discrete signal corresponding to a second predetermined point of the periodic waveform, the second signal being spaced in time from the first signal according to the phase shift applied in the second path, control signal generating means connected to receive the first and second discrete signals for producing an output corresponding to the interval between said discrete signals, means connected to receive the output for producing and transmitting a radio signal of distinct character and of a duration corresponding to that of the output received thereby, the receiver means including means for receiving the radio signal and reproducing the output, and means for producing a control voltage which varies as a function of the duration of the output.

7. A radio control system including transmitter means and receiver means, the transmitter means including means for producing a plurality of periodic waveforms of similar wave shape but progressively shifted in phase by a predetermined angle, a plurality of control channels connected to receive respective periodic waveforms from the last mentioned means, each of the control channels comprising first and second waveform processing paths, the first paths including means for producing a first discrete signal corresponding to a first predetermined point of the periodic waveform received thereby, the second paths including means for selectively phase-shifting the periodic waveform received thereby and means for producing a second discrete signal corresponding to a second predetermined point of said received waveform, the second signal being spaced in time from the first signal according to the phase shift applied in the second paths, a plurality of control signal generator means having first and second inputs and an output for producing control signals corresponding in duration to the time interval between signals applied to the inputs, the first and second inputs of the generator means being connected to receive the first and second discrete signals, respectively, of respective control channels, master control means operatively connected to said second paths for individually selecting the degree of phase shift of the respective periodic waveforms in the paths, a plurality of output means connected to receive respective control signals for producing output signals of distinct frequency in response to control signals and for the duration of the respective control signals received thereby, means connected to receive the output signals for producing and transmitting a radio signal having distinct time staggered components of respective durations corresponding to that of the output signals received thereby, the receiver means including means for receiving the radio signals, a plurality of filter means for separating the radio signal into components of the distinct frequencies, and a plurality of means for receiving the filtered components for producing respective control voltages which individually vary as functions of the duration of the corresponding output signal components.

References Cited

UNITED STATES PATENTS

| | | | |
|---|---|---|---|
| 2,684,472 | 7/1954 | Auvil | 340—207 |
| 2,760,132 | 8/1956 | Pawley | 340—207 |
| 3,094,696 | 6/1963 | Zadoff | 340—170 |
| 3,223,925 | 12/1965 | Floroc | 340—207 |

FOREIGN PATENTS

| | | |
|---|---|---|
| 707,038 | 3/1965 | Canada. |

JOHN W. CALDWELL, *Primary Examiner.*

NEIL C. READ, *Examiner.*

A. J. KASPER, *Assistant Examiner.*